United States Patent
Kitade

[11] Patent Number: 5,921,682
[45] Date of Patent: *Jul. 13, 1999

[54] CURVE MOTION ROLLING GUIDE UNIT

[75] Inventor: Norimitsu Kitade, Tokyo, Japan

[73] Assignee: Nippon Thompson Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,792

[22] Filed: Jun. 30, 1997

[30] Foreign Application Priority Data

Jul. 17, 1996 [JP] Japan .................................. 8-205499

[51] Int. Cl.$^6$ ...................................................... F16C 29/06
[52] U.S. Cl. .............................................................. 384/43
[58] Field of Search ................................ 384/43, 44, 45; 464/168

[56] References Cited

U.S. PATENT DOCUMENTS

| | | | |
|---|---|---|---|
| 4,480,879 | 11/1984 | Reith et al. | 384/43 |
| 5,158,373 | 10/1992 | Hanaway | 384/49 |
| 5,221,145 | 6/1993 | Borel | 384/43 |
| 5,308,170 | 5/1994 | Yamaguchi et al. | 384/43 |
| 5,584,765 | 12/1996 | Ochiai . | |

FOREIGN PATENT DOCUMENTS

| | | |
|---|---|---|
| 1913495 | 9/1970 | Germany . |
| 3139934 | 4/1983 | Germany . |
| 58-052317 | 4/1983 | Japan . |
| 63-186028 | 8/1988 | Japan . |
| 3-061046 | 9/1991 | Japan . |
| 7-003247 | 1/1995 | Japan . |
| 2026103 | 1/1980 | United Kingdom . |
| 1574258 | 9/1980 | United Kingdom . |
| 9701713 | 1/1997 | WIPO . |

OTHER PUBLICATIONS

Hiroshi, T, "Bearing For Curvilinear Sliding", Japan Abstract 63186028, Jan. 26, 1988.

*Primary Examiner*—Lenard A. Footland
*Attorney, Agent, or Firm*—Browdy and Neimark

[57] ABSTRACT

This curve motion rolling guide unit comprises a spline shaft extending in the longitudinal direction curvilinearly with a predetermined curvature, and a slider fitted around and moved curvilinearly on the spline shaft. The slider comprises a casing, end caps fixed to both end surfaces of the casing, and end seals fixed to end surfaces of the end caps. The casing is provided with raceway grooves in an inner circumferential surface thereof on which rolling elements roll, and return passages. The casing being split into a pair of casing members in the longitudinal direction, and engaged with and fixed to each other at the dividing surfaces thereof.

9 Claims, 6 Drawing Sheets

CURVE MOTION ROLLING GUIDE UNIT

BACKGROUND OF THE INVENTION

1. Field of the Invention

This invention relates to a curve motion rolling guide unit in which a slider is formed relatively slidably with respect to a spline shaft, which extend in a longitudinally curved manner, via rolling elements.

2. Description of the Prior Art

A ball spline in which a rolling element-carrying slider is moved linearly along a spline shaft has heretofore been applied to an industrial robot and a transfer machine. The known ball splines include a ball spline provided with retainer members for holding a plurality of balls on a slider, and a ball spline not provided with retainer members.

Figure 9:
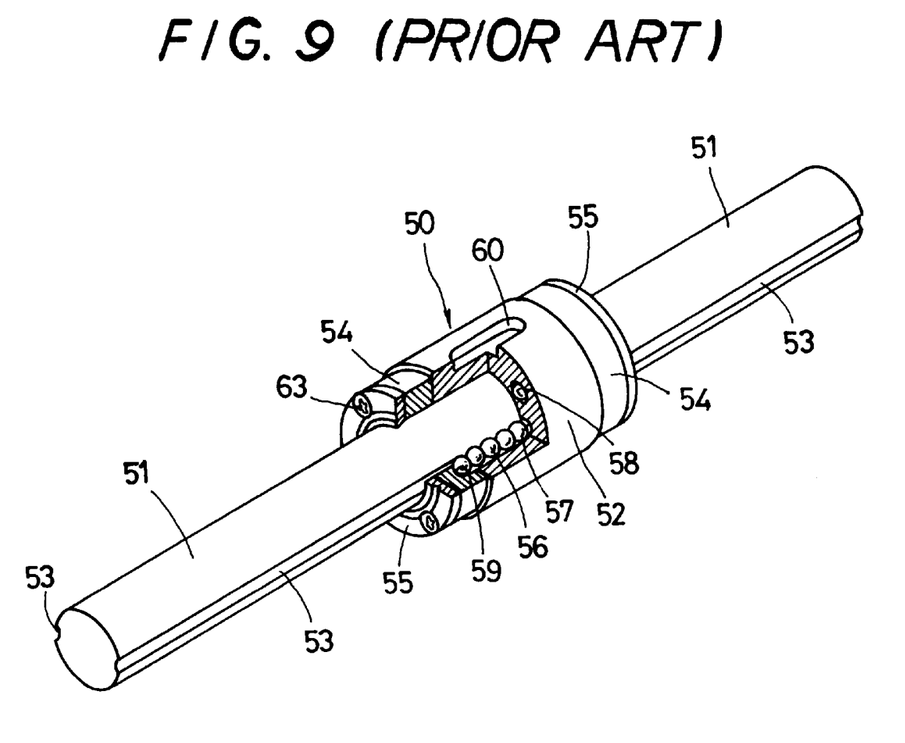
FIG. 9 is a partially cutaway view in perspective showing a conventional ball spline.
Figure 10:
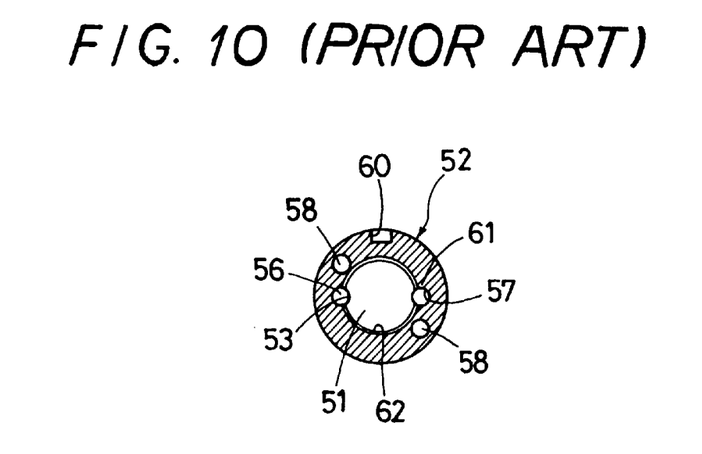
FIG. 10 is a sectional view showing the ball spline of FIG. 9.

Conventional ball splines not provided with retainer members include a ball spline shown in FIGS. 9 and 10. This ball spline has a spline shaft 51 provided with a plurality of raceway grooves 53 in predetermined axially extending portions of an outer circumferential surface thereof, and an outer cylinder 50 fitted slidably at its hollow 62 around the spline shaft 51. The outer cylinder 50 comprises a casing 52 provided with raceway grooves 57 in an inner circumferential surface thereof and return passages 58, end caps 54 fixed to both end surfaces of the casing 52 and provided with direction changing passages 59, end seals 55 fixed to end surfaces of the end caps and adapted to seal clearances between the spline shaft 51 and outer cylinder 50, and rolling elements 56 endlessly circulated in the raceway grooves 57, direction changing passages 59 and return passages 58.

The casing 52 is provided with a keyway 60 for setting and positioning an object member of an apparatus therein. The casing 52 is further provided in an inner circumferential surface of the hollow 62 with raceway grooves 57 opposed to those 53 in the spline shaft 51. The end seals 55 are fixed to the casing 52 through the end caps 54 by bolts 63. The raceway grooves 57 formed in the casing 52 are provided at their edge portions with opposed claws 61, the distance between which is set smaller than the diameter of the balls 56, for the purpose of retaining the balls 56 which constitute the rolling elements (refer to, for example, Japanese Patent Publication No. 61046/1991).

Figure 11:
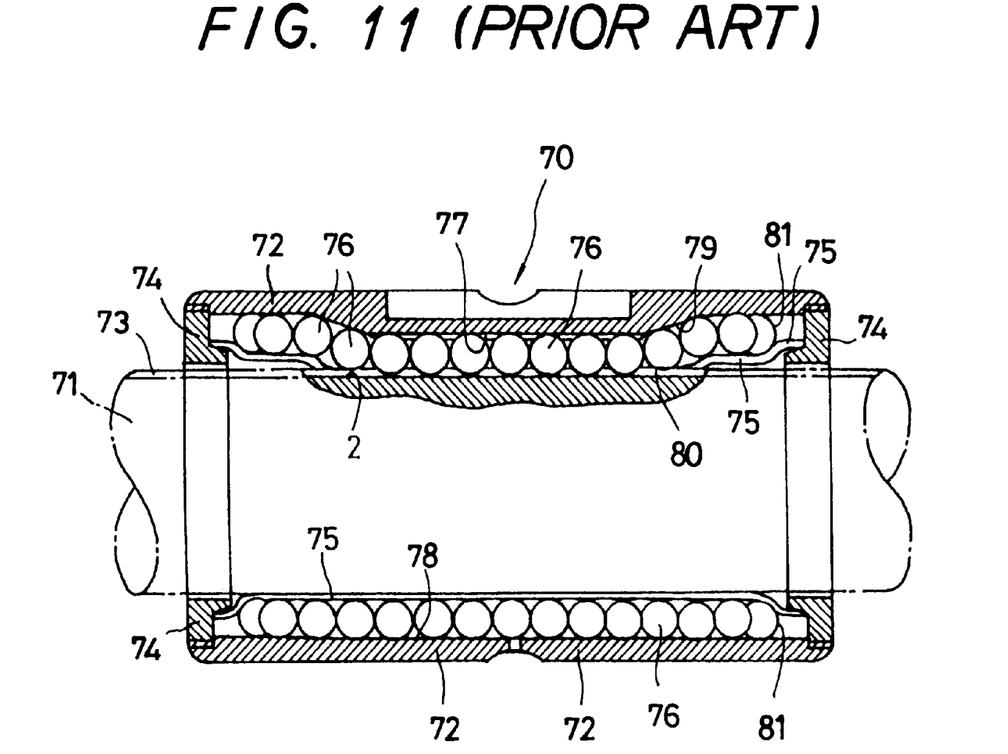
FIG. 11 is a sectional view showing another conventional ball spline.

The known ball splines provided with retainer members include a ball spline shown in FIG. 11. This ball spline comprises a spline shaft 71 provided with a plurality of raceway grooves 73 in predetermined axially extending portions of an outer circumferential surface thereof, and a slider 70 moving slidingly on the spline shaft 71, the slider 70 comprising an outer cylinder 72 provided on the inner side thereof with raceway grooves 77 opposed to those 73 in the spline shaft 71, and inclined surfaces 79 in which direction changing passages 81 for changing the direction of movement of the balls 76 are formed, retainer members 75 for holding the balls 76 on the inner surface of the outer cylinder 72, and a plurality of balls 76.

The retainer members 75 are formed entirely to a thin-walled seamless cylinder having a larger diameter at the portions thereof which correspond to the balls 76 in non-loaded regions of return passages 78 in the retainer members 75, and a smaller diameter at the portions thereof which correspond to the balls 76 in loaded regions of the raceway grooves 77. The retainer members 75 are provided with elongated bores 80 so that the balls 76 rolling in the loaded regions project slightly therefrom. The retainer members 75 are fixed to the outer cylinder 72 by screwing nut covers 74 to both end portions of the inner circumferential surface of the outer cylinder 72 (refer to, for example, Japanese Utility Model Laid-Open No. 52317/1983 and Japanese Patent Publication No. 3247/1995).

Bearings for a curved sliding motion include a bearing disclosed in Japanese Patent Laid-Open No. 186028/1988. This bearing for a curved sliding motion is adapted to guide curvilinearly an object which requires to be moved from a reference position to another objective position at a slider portion of various kinds of machine tools, industrial robots or part transfer systems. This bearing for a curved sliding motion comprises a sliding base having a cover fixed thereto, and provided with endless raceways for balls each of which comprises a loaded ball groove and a nonloaded ball passage, a track rail having ball rolling grooves opposed to the loaded ball grooves, and balls rolling as they bear a four-directional load between the loaded ball grooves and nonloaded ball passages. The track rail is formed so as to have an arcuate or circular cross section, and the center of an imaginary circle passing the loaded ball grooves in the sliding base and ball rolling grooves in the track rail is aligned with that of an imaginary circle passing the outer circumferential surface of the track rail.

The ball spline shown in FIG. 9 is provided with ball retaining portions on the side edge parts of the raceway grooves 57 in the outer cylinder 50, and it is considerably difficult to form ball retaining portion-carrying raceway grooves 57 in the outer cylinder 50. Unlike the raceway grooves 57 in the casing in a linear motion rolling guide unit, the raceway grooves 57 in the ball spline cannot be formed by using a large-diameter grindstone. Therefore, the inner raceway grooves 57 in the outer cylinder 50 are formed by broaching the outer cylinder, and thereafter quenching the resultant product and finishing the quenched product by polishing. The finishing work is difficult, and many manufacturing mandays are required. Since the inner raceway grooves 57 in the outer cylinder in the ball spline are formed by broaching, the axial length with respect to the inner diameter is limited, so that race grooves of a large length cannot be formed.

In the linear motion rolling guide unit shown in FIG. 11, the raceway grooves 77 in the outer cylinder 72 are provided at both of the axial end portions of the ball loaded regions with escape parts, which comprise inclined grooves, for the purpose of guiding the balls 76 moving in the direction changing passages 81 in the retainer members 75. Therefore, the forming the raceway grooves 77 is difficult, and the manufacturing cost becomes high. In the conventional linear motion rolling guide unit, there are difficulties in the broaching work and highly accurate finishing work for the raceway grooves 77 in the outer cylinder in which the retainer members 75 is provided. It is also troublesome to form mount portions, to which the retainer members 75 are fixed, in the outer cylinder 72, and the cost of manufacturing the outer cylinder increases.

SUMMARY OF THE INVENTION

An object of the present invention is to solve these problems, and provide a curve motion rolling guide unit obtained by forming a slider, which is adapted to be slid on a curvilinearly extending spline shaft, by a casing comprising a raceway groove-carrying two-split member; developing the techniques for forming the raceway grooves easily in the casing; fitting the slider smoothly around the spline shaft by changing the shape of the casing or end seals; and forming the end seals to a larger length at the upper circumferential side thereof and to a smaller length at the lower circumferential side thereof when the longitudinal size of the arcuate outer and inner circumferential portions of the casing is set equal or setting the longitudinal size of the casing larger at the upper circumferential portion thereof and smaller at the lower circumferential portion thereof, whereby the curvature of the casing comes to agree with that of the spline shaft to enable the slider to slide smoothly on the spline shaft.

This invention relates to a curve motion rolling guide unit comprising a spline shaft extending in the longitudinal direction curvilinearly with a predetermined curvature, and a slider fitted around and moved curvilinearly on the spline shaft, the slider comprising a plurality of rolling elements, a casing provided with raceway grooves and return passages extending in parallel with the raceway grooves in an inner circumferential surface thereof on which the rolling elements roll, end caps fixed to both end surfaces of the casing and provided with direction changing passages in which the direction of movement of the rolling elements is changed, and end seals fixed to both end surfaces of the end caps, the end seals sealing clearances between the spline shaft and slider, the casing being split into a pair of casing members in the longitudinal direction thereof, the split surfaces of the two casing members being engaged with and fixed to each other.

The casing is provided with a longitudinally extending keyway in an outer surface thereof so as to set and position an objective apparatus on the casing, or a flange having a reference fixing surface extending in the radial direction of the casing so as to set and position an objective apparatus on the casing.

The casing is further provided at edge portions of the raceway grooves with claws, which are adapted to prevent the rolling elements from falling from the raceway grooves, so as to extend in the longitudinal direction of the raceway grooves.

The casing is also provided with a fixing surface and screw holes in the fixing surface for fixing an objective apparatus to the casing.

The casing is formed so as to have either circular or square contours.

The casing members constituting the casing comprise an upper circumferential side casing member opposed to an arcuate upper circumferential side of the spline shaft, and a lower circumferential side casing member opposed to an arcuate lower circumferential side of the spline shaft, the longitudinal size of the upper circumferential side casing member being set larger than that of the lower circumferential side casing member.

In another example, the casing members constituting the casing comprise an upper circumferential side casing member opposed to an arcuate upper circumferential side of the spline shaft, and a lower circumferential side casing member opposed to an arcuate lower circumferential side of the spline shaft, the upper circumferential side casing member being provided at a longitudinally intermediate portion thereof with a center cap on longitudinally both sides of which direction changing passages for changing the direction of movement of the rolling elements are formed, an endless circulating passage, in which the rolling elements roll, in the upper circumferential side casing member being thereby divided into two.

The spline shaft is provided with raceway grooves, which are opposed to those formed in the casing, along the ridge lines of the arcuate upper and lower circumferential side surfaces thereof.

Since the curve motion rolling guide unit according to the present invention is constructed as described above, the slider can be slid smoothly on the spline shaft.

The slider comprises the casing, end caps, and end seals. The casing is formed to a square or circular cross-sectional shape correspondingly to an apparatus to which it is applied, whereby the curve motion rolling guide unit can be adapted to an apparatus into which it is incorporated. Since the spline shaft and casing are provided with opposed raceway grooves, the slider can be slid forward and backward with a high accuracy with respect to the spline shaft without being turned around the axis thereof.

Since the casing is formed of two equally divided casing members, the assembling of the casing and the forming of raceway grooves of a high accuracy in the casing members can be done easily. The upper circumferential side rolling elements rolling in the arcuate raceway groove have a larger load than the lower circumferential side rolling elements. However, according to the present invention, the arcuate upper circumferential side casing element is formed longer in the lengthwise direction than the arcuate lower circumferential side casing element, so that a load can be set equal with respect to the rolling element rolling in the loaded regions. Owing to the center cap provided in the upper casing element, the circulation resistance of the rolling elements enable the balance of the sliding resistance thereof to be improved.

DETAILED DESCRIPTION OF THE EMBODIMENTS

Various types of embodiments of the curve motion rolling guide unit according to the present invention will now be described with reference to the drawings.

Figure 1:
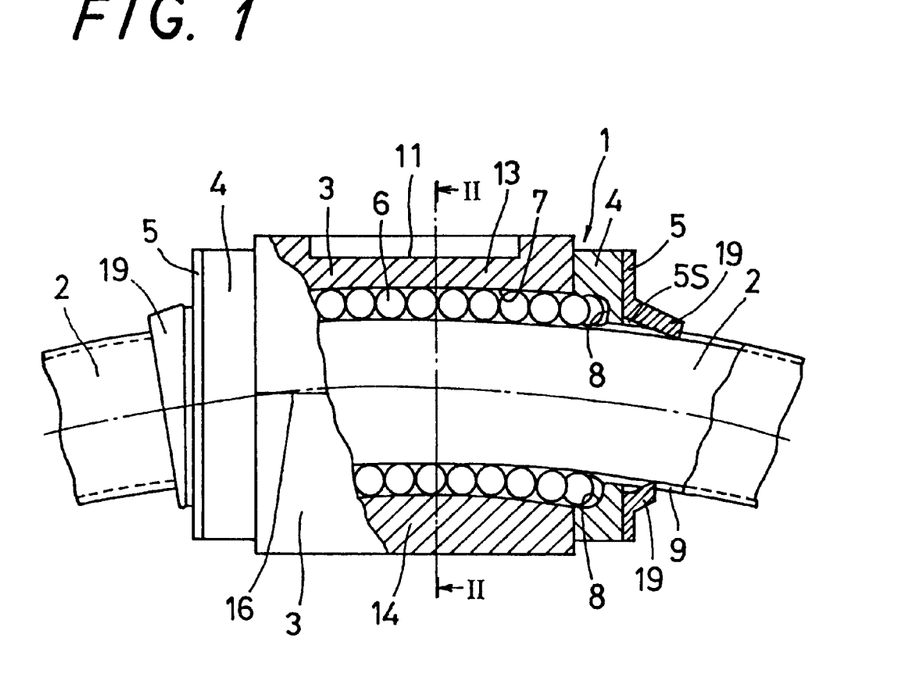
FIG. 1 is a partially cutaway view in section showing a first embodiment of the curve motion rolling guide unit according to the present invention.
Figure 2:
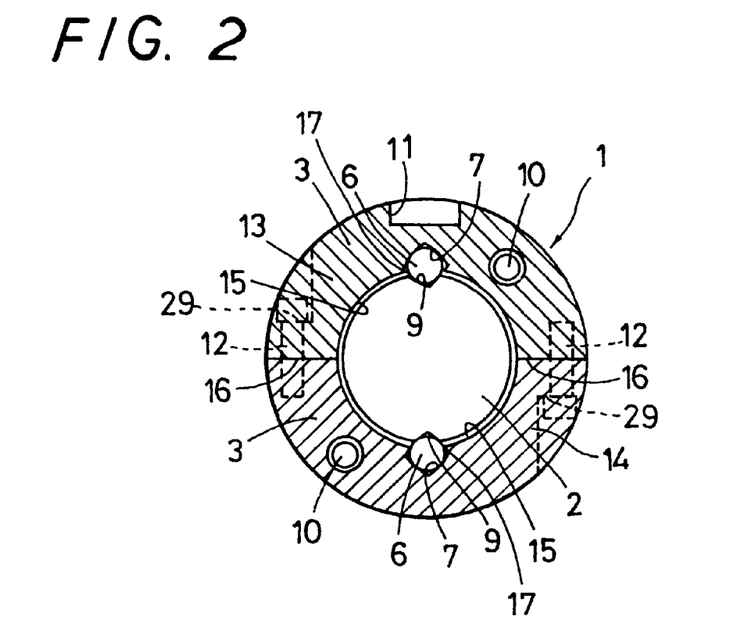
FIG. 2 is a sectional view taken along the line A—A in FIG. 1 of the curve motion rolling guide unit.

First, a first embodiment of the curve motion rolling guide unit according to the present invention will be described with reference to FIGS. 1 and 2.

This curve motion rolling guide unit comprises mainly a spline shaft 2 extending curvilinearly in the longitudinal direction with a predetermined (constant) curvature, and a slider 1 which is provided with a longitudinally extending through hollow at which the slider is fitted around the spline shaft 2, and which is moved curvilinearly along the spline shaft 2. The slider 1 comprises a casing provided with raceway grooves 7 in an inner circumferential surface 15 on which rolling elements 6 roll, and return passages 10 formed separately from the raceway grooves 7, end caps 4 fixed to both end surfaces of the casing 3 and provided with direction changing passages in which the direction of movement of the rolling elements 6 is changed, and end seals 5 fixed to the end surfaces of the end caps 4 and adapted to seal a clearance 5S between the spline shaft 2 and slider 1. The spline shaft 2 is bent arcuately with a predetermined curvature, and provided in the longitudinally extending outer surface thereof with raceway grooves extending along ridge lines on the arcuate upper and lower circumferential side portions of the spline shaft. The longitudinally arcuately extending raceway grooves 7, the centers of curvature of which agree with that of the spline shaft 2, provided in the casing 3 of the slider 1 are opposed to the raceway grooves 9 in the spline shaft 2, and the rolling elements 6 roll in raceways formed by these raceway grooves 9, 7. Therefore, the slider 1 can be slid freely with a high accuracy on the spline shaft 2 without being turned around the axis of the spline shaft 2.

The casing 3 is formed to a circular cross section, and divided in the direction of the arcuate longitudinal axis of the spline shaft 2 into two equal parts, i.e. upper and lower circumferential side casing elements 13, 14, the dividing contact surfaces 16 of which are engaged with each other. The terms "upper" and "lower" as used herein conform to the drawing, and correspond to the alternative terms "outer" and "inner" respectively. The casing members 13, 14 are fixed to each other 1, for example, inserting bolts 12 into fixing holes formed in stepped portions the upper circumferential side casing member 13, and screwing the resultant bolts into bolt holes formed in the lower circumferential side casing member 14. The raceway grooves 7 in the casing 3 extend arcuately in the longitudinal direction of the spline shaft with the center of curvature of the former agreeing with that of the latter. These raceway grooves 7 are formed in the substantially circumferentially intermediate portions of the casing members 13, 14 and extend in the longitudinal direction thereof.

The casing members 13, 14 in the first embodiment are formed to substantially equal longitudinal length. The upper circumferential side casing member 13 is provided with a keyway 11 in which an object apparatus (not shown), in which the curve motion rolling guide unit is to be incorporated, is set and positioned. The keyway for use in setting and positioning an object apparatus therein may also be formed in the lower circumferential casing member 14. It is formed correspondingly to an apparatus in which the curve motion rolling guide unit is to be incorporated.

Each end seal 5 is provided with an annular wedge type lip 19 the length of which is larger at an upper circumferential portion thereof, and smaller at a lower circumferential portion thereof so that the end seal contacts the longitudinally annular spline shaft 2 at right angles to the axis thereof. The lip 19 contacts the outer circumferential surface of the spline shaft 2 and seals a clearance 5S between the spline shaft 2 and slider 1 so as to fulfill the functions of preventing extraneous matter, such as dust from entering the inner side of an inner circumferential surface 15 of the slider 1 via the clearance 5S and preventing a lubricating oil supplied to the inner circumferential surface 15 of the slider 1 from leaking out from the clearance 5S.

The return passages 10 formed in the casing 3 are adapted to circulatingly guide the rolling elements comprising non-loaded balls, and comprise linear through bores. The direction changing passages 8 formed in the end caps 4 communicate with the raceway grooves 7 and return passages 10 formed in the casing 3. The rolling elements 6 comprising balls roll endlessly and circulatingly in raceways in loaded regions comprising the raceway grooves 7 in the casing 3 and those 9 in the spline shaft 2, and raceways in nonloaded regions comprising the direction changing passages 8 in the end caps 4 and return passages 10 in the casing 3. Although this curve motion rolling guide unit does not have retainers for holding the rolling elements 6, the raceway grooves 7 in the casing 3 are provided with claws 17 extending along the longitudinal edge portions thereof and formed by setting a distance between opposed edges, which define elongated bores, of the raceway grooves 7 to a level smaller than the diameter of the rolling elements 6 so as to prevent the rolling elements 6 from falling from the raceway grooves 7.

Figure 3:
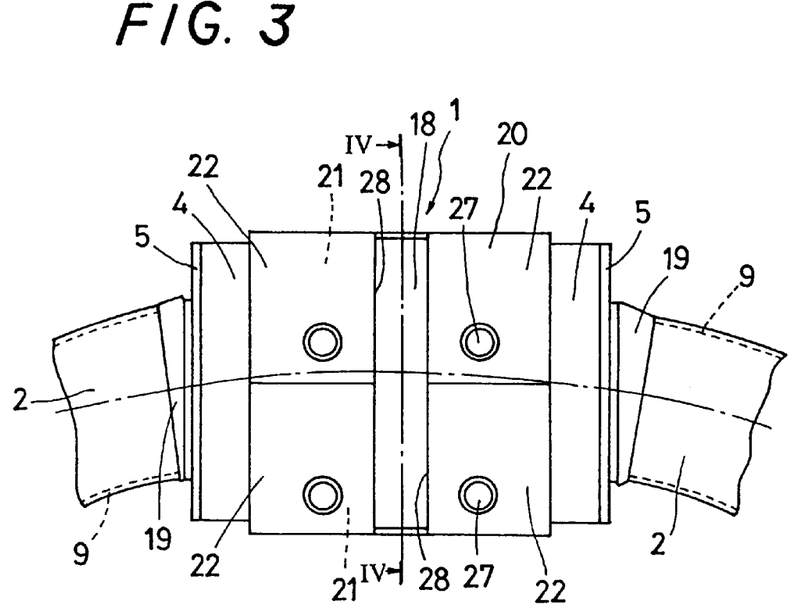
FIG. 3 is a plan view showing a second embodiment of the curve motion rolling guide unit according to the present invention.
Figure 4:
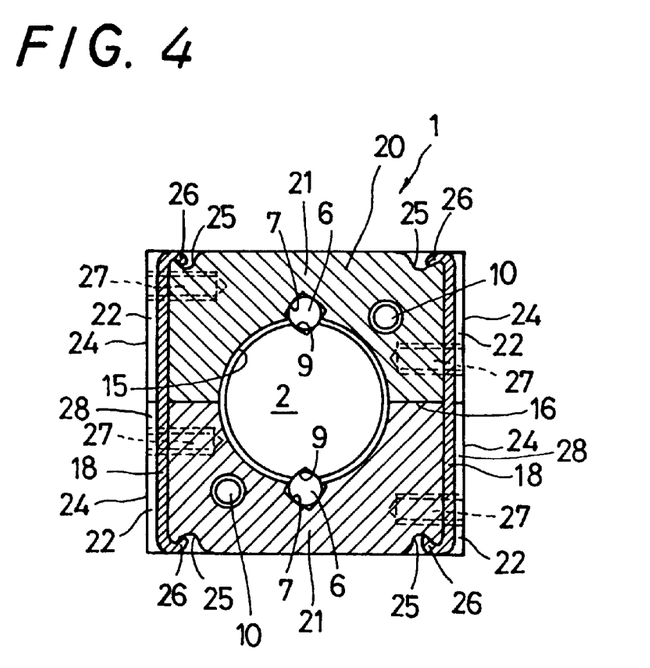
FIG. 4 is a sectional view taken along the line B—B in FIG. 3.

A second embodiment of the curve motion rolling guide unit according to the present invention will now be described with reference to FIGS. 3 and 4. Since the second embodiment has the same construction and function as the first embodiment except that the shape of a casing is different, the same parts are designated by the same reference numerals, whereby the duplication of descriptions of the parts is omitted.

In the second embodiment, a slider 1 comprising a casing 20, end caps 4 and end seals 5. The casing 20 is formed so as to have a square cross-sectional contour line, and divided in the longitudinal direction into two equal parts, i.e. a pair of casing members 21, which are fixed to each other at constant surfaces 16 as dividing surfaces by fastening members 18. The casing members 21 are provided at the longitudinally intermediate portions of outer circumferential surfaces thereof with rectangularly or circularly extending recesses 28. Fastening members 18 comprising bands or metal members for fixing the casing members 21 to each other are fitted in these recesses 28, the casing members being fixed to each other by the same members 18.

The casing members 21 are provided with locking grooves 25 in the surfaces thereof which are on the opposite side of the contact surfaces 16. Since the casing elements 21 are provided with fixing surfaces 24, the outer surfaces of the casing elements 21 are planar. In the illustrated embodiment, the fastening members 18 are provided with locking claws 26 at both ends thereof. To bring the contact surfaces 16 of the casing members 21 into close contact with each other, the locking claws 26 of the fastening members 18 are engaged with the locking grooves 25 in the casing members 21, whereby the casing members 21 are fixed closely to each other.

The casing 20 is provided with the fixing surfaces 24 on both sides thereof so as to fix an object apparatus thereto, and screw holes 27 are formed in the fixing surfaces 24. The fixing surfaces 24 are positioned and formed on both or one vertical side of the casing members 21 with respect to a horizontal plane of the arcuately extending spline shaft 2. Namely, the fixing surfaces 24 are formed in the parallel-extending planes of the cross-sectionally squarely formed casing 20 which are parallel to a vertical plane in which the spline shaft 2 extends.

Figure 5:
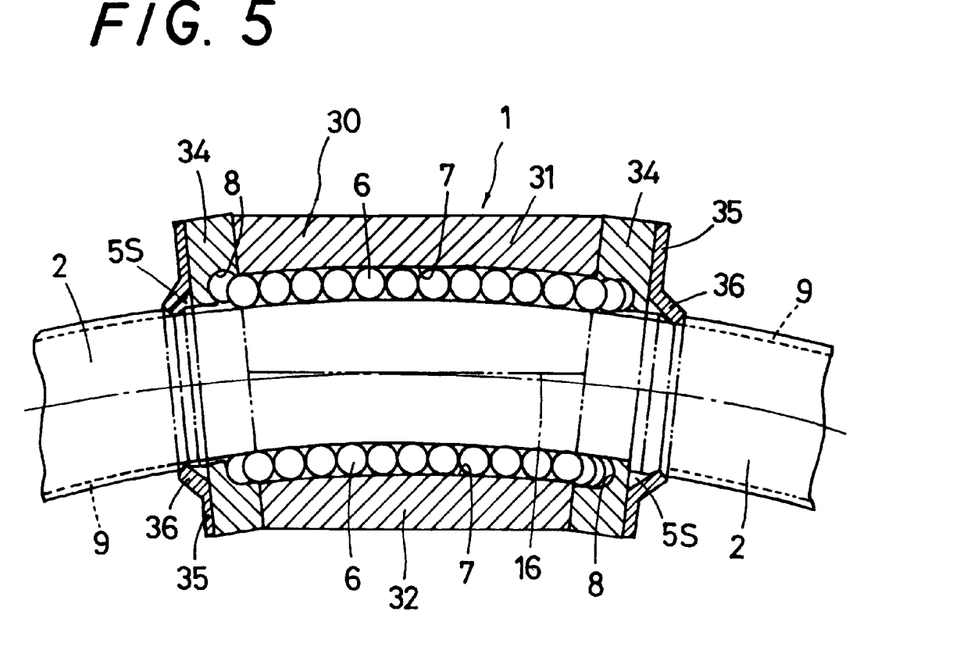
FIG. 5 is a sectional view showing a third embodiment of the curve motion rolling guide unit according to the present invention.

A third embodiment of the curve motion rolling guide unit according to the present invention will now be described with reference to FIG. 5. Since the third embodiment has the same construction and function as the previously-described embodiments except that the shape of a casing is different, the same parts are designated by the same reference numerals, whereby the duplication of the descriptions thereof is omitted.

A slider 1 in the third embodiment comprises a casing 30, end caps 34 and end seals 35 provided with lips 36. The casing 30 comprises an upper circumferential side casing member 31 opposed to an arcuate upper circumferential side portion of a spline shaft 2, and a lower circumferential side casing member opposed to an arcuate lower circumferential side portion of the spline shaft 2. The raceway grooves 7 in the casing 30 are formed arcuately with a curvature in accordance with that of the arcuately extending spline shaft 2. The end surfaces of the casing 30 are inclined in the shape of a fan so that they extend at right angles to the arcuate surface of the spline shaft 2. The casing members 31, 32 are formed generally to a cross-sectionally trapezoidal shape. The end seals 35 are provided with lips 36 the arcuate upper and lower circumferential side portions of which extend to a substantially equal length.

In the third embodiment, the upper circumferential side casing member 31 receives a larger load than the lower circumferential side casing element 32. Accordingly, the length of the raceway groove 7 in the casing member 31 is set larger than that of the raceway groove 7 in the casing member 32, whereby a load imparted to the casing elements 31, 32 is balanced well.

Figure 6:
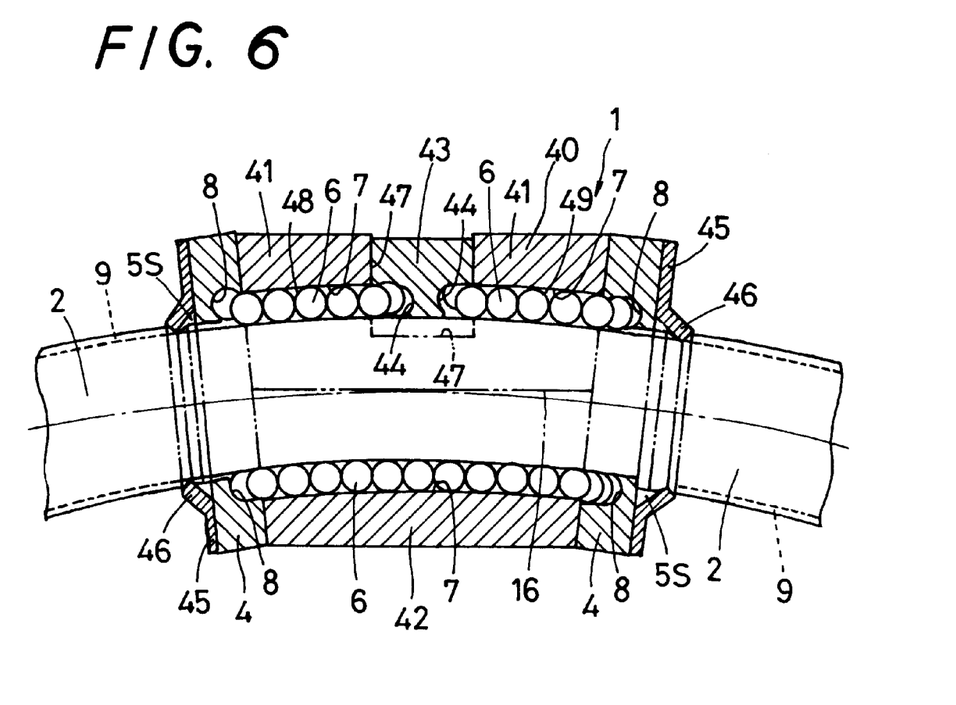
FIG. 6 is a sectional view showing a fourth embodiment of the curve motion rolling guide unit according to the present invention.

A fourth embodiment of the curve motion rolling guide unit according to the present invention will now be described with reference to FIG. 6. Since the fourth embodiment has the same construction and function as the third embodiment except that the shape of a casing is different, the same parts are designated by the same reference numerals, whereby the duplication of the descriptions thereof is omitted.

A slider 1 in the fourth embodiment comprises a casing 40, end caps 4 and end seals 45 provided with lips 46. The casing 40 comprises an upper circumferential side casing element 41 opposed to an arcuate upper circumferential side portion of the spline shaft 2, and a lower circumferential side casing member 42 opposed to an arcuate lower circumferential side portion of the spline shaft 2. The raceway grooves 7 in the casing 40 are formed arcuately with a curvature equal to that with which the spline shaft 2 is arcuately formed. The upper circumferential side casing element 41 is provided at a longitudinally intermediate portion thereof with a bore 47, in which a center cap 43 having on longitudinally both sides thereof direction changing passages 44 for changing the direction of movement of rolling elements 6 is provided.

In the fourth embodiment, the upper circumferential side casing element 41 receives a larger load than the lower circumferential side casing element 41. Accordingly, the length of the raceway grooves 7 in the casing element 41 is set larger than that of the raceway groove 7 in the casing member 42, whereby a load imparted to the casing members 41, 42 is balanced well. The speed of the rolling elements 6 comprising balls and rolling in an endless circulating passage in the upper circumferential side casing element 41 becomes higher than that of those rolling in an endless circulating passage in the lower circumferential side casing element 42. Therefore, when an endless circulating passage is formed to a large length, the circulation resistance increases due to the contact of the rolling elements with one another. Accordingly, the endless circulating passage in the upper circumferential side casing element 41 is divided into two by the center cap 43.

Owing to the center cap 43 provided in the casing member 41, the endless circulating passage in which the rolling elements roll are divided into two, i.e. endless circulating passages 48, 49. Since the endless circulating passage is divided into two 48, 49, the circulation resistance of the rolling elements rolling therein can be reduced, and the balance of the sliding resistance of the rolling element on the lower and upper circumferential sides can be improved.

In each of the above-described embodiments, a keyway is provided in the casing for the purpose of positioning an object apparatus with respect to the casing and fixing the apparatus thereto. However, such a means provided for this purpose is not limited to a keyway. A flange 37 can be provided for this purpose as in the fifth and sixth embodiments shown in FIGS. 7 and 8.

Figure 7:
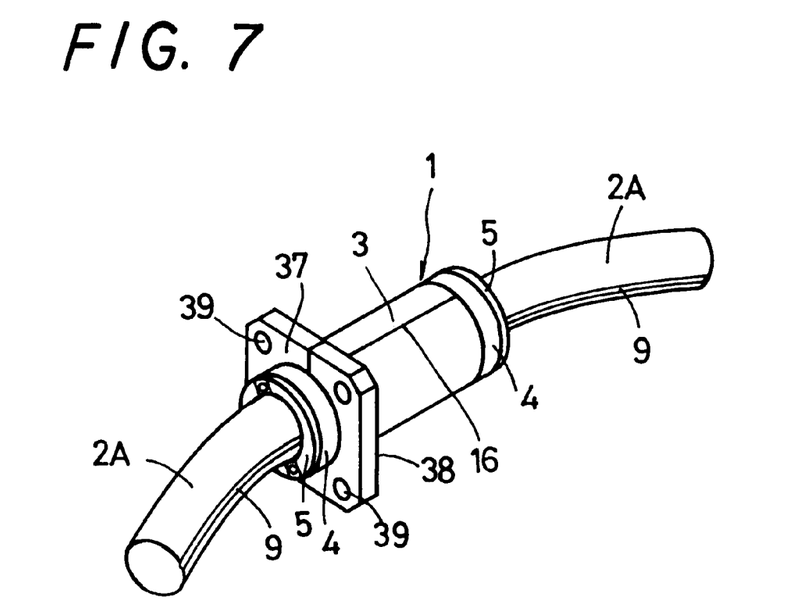
FIG. 7 is a perspective view of a fifth embodiment of the curve motion rolling guide unit according to the present invention.
Figure 8:
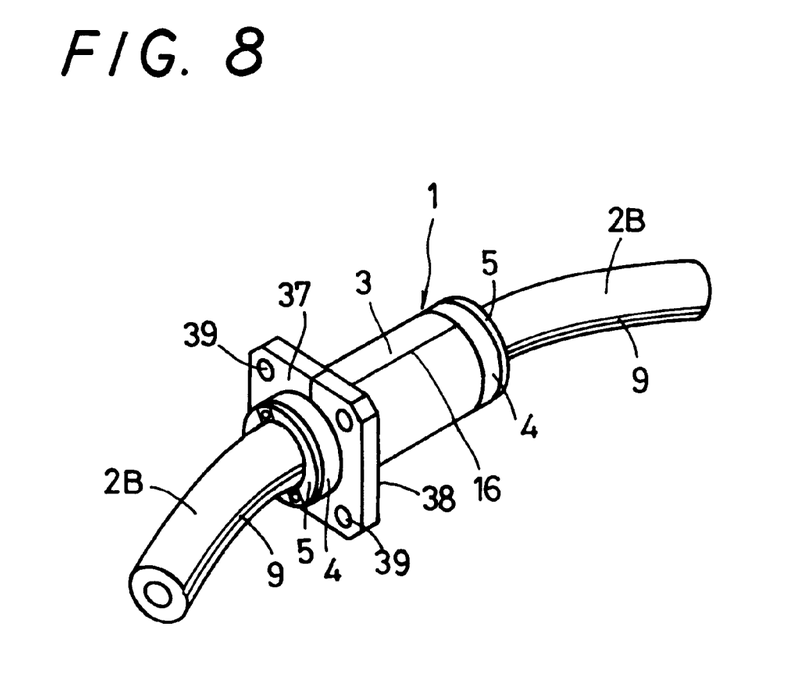
FIG. 8 is a perspective view of a sixth embodiment of the curve motion rolling guide unit according to the present invention.

As shown in FIGS. 7 and 8, a flange 37 extending in the radial direction of a casing 3 is formed, and a fixing reference surface 38 on the flange 37, an object apparatus being able to be positioned by bringing the apparatus into contact with this fixing reference surface 38. In another case, a flange 37 extending in the radial direction of a casing is formed, and a fixing portion on the flange 37, fixing screw holes 39 being able to be provided in this fixing portion for the purpose of fixing an object apparatus thereto. In the embodiment shown in FIG. 7, a spline shaft 2 comprises a solid shaft 2A. In the embodiment shown in FIG. 8, a hollow shaft 2B is used.

The curve motion rolling guide unit according to the present invention can be formed as described in each of the above-described embodiments but it is not limited to these embodiments. For example, in the above-described embodiments, the casing is not provided with retainers for holding the rolling elements but it can be provided in some cases with circuit type passage-carrying retainers for the endless circulation of the rolling elements. In the above-described embodiments, the contact surfaces of the casing elements comprise planar surfaces but these contact surfaces can also be provided with a recessed portion and a projecting portion which are engageable with each other. The spline shaft may not necessarily be provided with raceway grooves in certain cases. In a curve motion rolling guide unit of the type which does not require the accuracy of a sliding movement of the slider, the slider can be formed out of a plastic, and the spline shaft can comprise a spline shaft of the type which does not require raceway grooves to be formed therein.

What is claimed is:

1. A curve motion rolling guide unit comprising
a spline shaft extending in the longitudinal direction curvilinearly with a predetermined curvature, and
a slider fitted around and moved curvilinearly on said spline shaft,
said slider comprising rolling elements, a casing provided with casing raceway grooves and return passages extending in parallel with said casing raceway grooves in an inner circumferential surface thereof on which said rolling elements roll, and caps fixed to both end surfaces of said casing and provided with direction changing passages in which the direction of movement of said rolling elements is changed, and end seals fixed to both end surfaces of said end caps, said end seals sealing clearances between said spline shaft and said slider, said casing being split into a pair of casting members in a longitudinal direction thereof, each of said casing members including at least one respective one of said casing raceway grooves and said return passages, said casing members comprising an arcuate outer circumferential side casing member opposed to an arcuate outer circumferential side of said spline shaft, and an arcuate inner circumferential side casing member opposed to an arcuate inner circumferential side of said spline shaft, split surfaces of said casing members being engaged with and fixed to each other, said spline shaft being provided with spline raceway grooves, each of which extends longitudinally of the spline shaft along any one of the outermost and innermost curvilinear lines on the spline shaft, and any one of said casing raceway grooves being provided on the arcuate inner circumferential side casing member along a line which extends longitudinally of the arcuate inner circumferential side casing member in opposition to the innermost curvilinear line on said spline shaft, and the other of said casing raceway grooves being provided on the arcuate outer circumferential side casing member along a line which extends longitudinally of the arcuate outer circumferential side casing member in opposition to the outermost curvilinear line on said spline shaft.

2. The curve motion rolling guide unit according to claim 1, wherein said casing is provided with a longitudinally extending keyway in an outer surface thereof so as to set and position an objective apparatus on said casing.

3. The curve motion rolling guide unit according to claim 1, wherein said casing is provided with a flange having a reference fixing surface extending in the radial direction of said casing so as to set and position an objective apparatus on said casing.

4. A curve motion rolling guide unit according to claim 1, wherein said casing is provided with a fixing surface and screw holes made in said fixing surface, for fixing an objective apparatus to said casing.

5. A curve motion rolling guide unit according to claim 1, wherein said casing is formed so as to have an either circular or square cross-sectional shape.

6. A curve motion rolling guide unit according to claim 1, wherein said casing members constituting said casing comprise an upper circumferential side casing member opposed to an arcuate upper circumferential side of said spline shaft, and a lower circumferential side casing member opposed to an arcuate lower circumferential side of said spline shaft, a longitudinal size of said upper circumferential side casing member being set larger than that of said lower circumferential side casing member.

7. A curve motion rolling guide unit according to claim 1, wherein said casing members constituting said casing comprise an upper circumferential side casing member opposed to an arcuate upper circumferential side of said spline shaft, and lower circumferential side casing member opposed to an arcuate lower circumferential side of said spline shaft, said upper circumferential side casing member being provided at a longitudinally intermediate portion thereof with a center cap on longitudinally both sides of which direction changing passages for changing the direction of movement of said rolling elements are formed, two separate endless circulating passages, in which said rolling elements roll, being provided in said upper circumferential side casing member.

8. A curve motion rolling guide unit comprising a spline shaft of generally circular cross-section extending in the longitudinal direction curvilinearly with a predetermined curvature, and a slider fitted around and moved curvilinearly on said spline shaft, said slider comprising rolling elements, a casing provided with a pair of raceway grooves spaced apart approximately 180° from one another and return passages extending in parallel with said raceway grooves in an inner circumferential surface thereof on which said rolling elements roll, and caps fixed to both end surfaces of said casing and provided with direction changing passages in which the direction of movement of said rolling elements is changed, and end seals fixed to both end surfaces of said end caps, said end seals sealing clearances between said spline shaft and said slider, said casing being split into a pair of casing members in the longitudinal direction thereof, the split surfaces of said two casing members being engaged with and fixed to each other, and raceway grooves provided in said spline shaft facing said raceway grooves of said casing of said slider, whereby a said rolling element extends partway into a said raceway groove of said casing and partway into a said raceway groove of said spline shaft.

9. A curve motion rolling guide unit comprising a spline shaft extending in the longitudinal direction curvilinearly with a predetermined curvature, and a slider fitted around and moved curvilinearly on said spline shaft, said slider comprising rolling elements, a casing provided with casing raceway grooves and return passages extending in parallel with said casing raceway grooves in an inner circumferential surface thereof on which said rolling elements roll, end caps fixed to both end surfaces of said casing and provided with direction changing passages in which the direction of movement of said rolling elements is changed, and end seals fixed to both end surfaces of said end caps, said end seals sealing clearances between said spline shaft and said slider, said casing being split into a pair of casing members in the longitudinal direction thereof, each of said casing members including at least one respective one of said casing raceway grooves and said return passages, said casing members comprising an outer circumferential side casing member opposed to an arcuate outer circumferential side of said spline shaft, and an inner circumferential side casing member opposed to an arcuate inner circumferential side of said spline shaft, split surfaces of said two casing members being engaged with and fixed to each other;

wherein said casing is provided at edge portions of said raceway grooves with claws, which are adapted to prevent said rolling elements from falling from said raceway grooves, so as to extend in the longitudinal direction of said raceway grooves.

\* \* \* \* \*